UNITED STATES PATENT OFFICE.

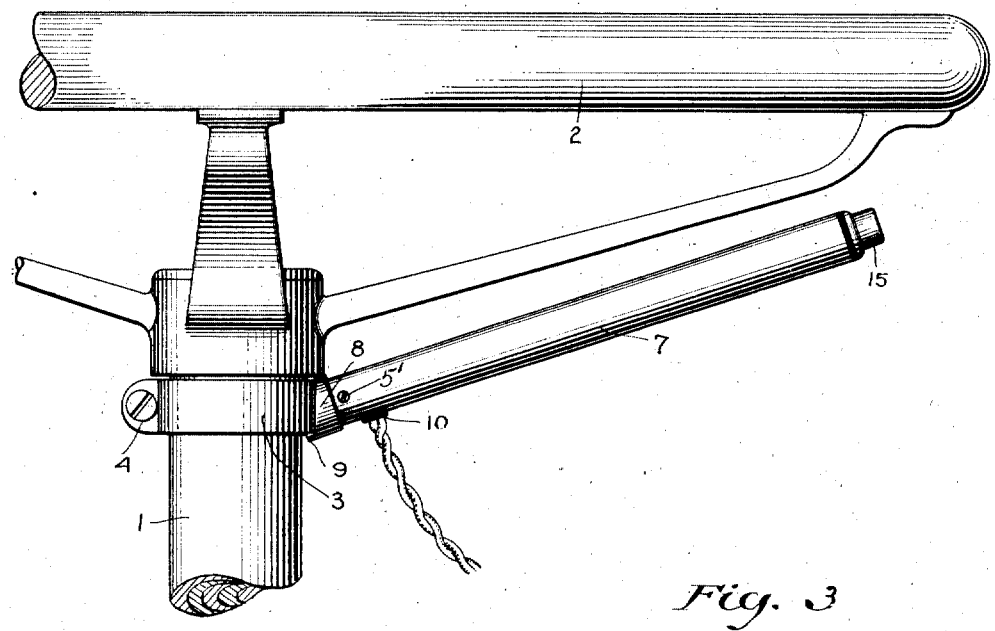
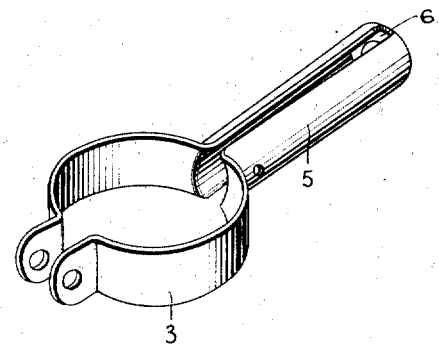
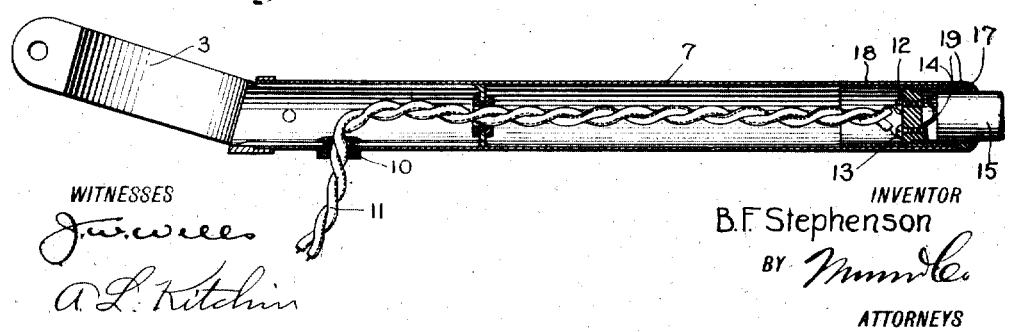

BENJAMIN FRANKLIN STEPHENSON, OF EDMONTON, ALBERTA, CANADA.

ELECTRIC-HORN CONTROL.

1,212,709.  Specification of Letters Patent.  Patented Jan. 16, 1917.

Application filed October 30, 1915. Serial No. 58,807.

*To all whom it may concern:*

Be it known that I, BENJAMIN F. STEPHENSON, a citizen of the United States, and a resident of Edmonton, in the Province of Alta and Dominion of Canada, have invented a new and Improved Electric-Horn Control, of which the following is a full, clear, and exact description.

This invention relates to signaling devices and particularly to a controlling device for electric horns, and has for an object the provision of an improved arrangement adapted to be connected to the steering post of an automobile in such a manner that the operating parts will be adjacent the hand at all times.

Another object in view is to provide a push button and support of some strong construction which will be easily operated by the hand provided with a glove and which will allow the proper operation without requiring the hand to be removed from the steering wheel.

In the accompanying drawings, Figure 1 is a side view of part of a steering wheel and post of an automobile with an embodiment of the invention applied thereto; Fig. 2 is a longitudinal vertical section through the invention disclosed in Fig. 1; Fig. 3 is a detail perspective view of a clamping member embodying certain features of the invention.

Referring to the accompanying drawing by numerals, 1 indicates a steering post of an automobile, the same being of any desired or usual construction. Connected with post 1 is a steering wheel 2 of any desired or usual construction.

In steering and controlling the various parts of an automobile driving mechanism it is desirable to leave the hands on the steering wheel continually, or as much as possible, especially when quick turning or quick operation of the mechanism of the automobile is desired. In using the ordinary horn now in common use it is necessary to remove one hand from the steering wheel to operate the horn. The present invention is intended to present a construction whereby the driver may freely operate an electrical horn without removing his hands from the wheel so that the steering mechanism will always be under complete control.

In order to provide a switch or connecting mechanism for the electrical current of an electrical horn a clamping bracket 3 is fitted around the post 1 and held in place by a suitable screw 4. The clamping bracket 3 is provided with a divided stem 5 and an apertured end 6. The stem 5 is adapted to be inserted into a tubular member 7 where it is held in place by friction, or a small screw 5′ extending through both member 7 and member 5, said tubular member 7 being formed with an enlarged end member 8 fitting against the body of the bracket 3 and formed with an underhanging projection 9 which extends beneath the bracket 3 and thereby prevents the rotation of the tubular member or casing 7. The tubular member or casing 7 is provided with an aperture near post 1 which aperture is provided with a tubular insulating spool 10, as more clearly shown in Fig. 2. The electrical wires 11 extend through the spool 10 and from thence through the apertured bottom 6 to the binding posts 12 and 13. Binding post 12 has connected therewith a spring switch 14 which extends to a point above binding post 12 and is normally out of contact therewith.

A button 15 of any suitable material, as for instance, rubber, pearl, celluloid, or other desirable material, is provided and rests against the spring 14. When the button 15 is forced inwardly the same depresses spring 14 until the spring engages the post 12, whereupon the circuit is complete and the horn (Fig. 1) is sounded. The button 15 is slidingly mounted in a metallic tubular member 16 having an overhanging portion 17. The member 16 is insulated from tube 7 by an insulating sleeve 18 having a head 19 extending between the overhanging portion 17 and the end of tube or casing 7. The button 15 preferably extends an appreciable distance away from member 16 so that the finger, or even the hand, when pressed against the button will cause a sufficient movement to close the circuit, whereby the button may be easily operated by the naked hand or by the hand when provided with a heavy glove. By providing the clamping bracket 3 with the screw 4 the button 15 may be located at any point around the wheel 2 and in actual use is preferably located beneath the point where the hand of the operator usually rests so that by extending his finger the button may be pushed at any time. It is to be observed that the button 15 and associated parts do not move around with the wheel 2 but are always in the same place after the same has once been adjusted.

What I claim is:—

1. In a control for electric horns, the combination with the steering post of an automobile and the wirings for the horn, of a member bent upon itself forming a tubular member and a pair of clamping arms, whereby a clamping bracket is produced, means for clamping said arms against said post, a tubular member fitting over the tubular portion of said bracket, said tubular member being provided with an aperture whereby the wires of said horn may be inserted into the tubular member, a switch arranged in the tubular member near the end opposite said bracket, and a button arranged in the end of the tubular member and projecting therefrom, said button being adapted to be pressed inwardly closing said switch, the outer end of said tubular member extending to a point adjacent said steering wheel.

2. In a controlling device for electric horns, the combination with a steering wheel and post and the wires of said horn, of a tubular member for receiving one end of said wires, said tubular member being formed with a projecting overhanging member, a clamping bracket frictionally held in said tubular member and arranged to clamp said steering post, said overhanging portion extending beneath said bracket whereby the tubular member cannot rotate, said tubular member being arranged at such an angle as to cause the outer end to be adjacent the periphery of said steering wheel, a switch connected with said wires and arranged in said tubular member and adjacent the outer end thereof, said switch being formed with a spring for normally maintaining the contacts separate, and a movable button arranged in the outer end of said tubular member, said button being adapted to be pressed for closing said switch, said spring moving said button when released so as to open said switch.

In testimony whereof I have signed my name to this specification in the presence of two subscribing witnesses.

BENJAMIN FRANKLIN STEPHENSON.

Witnesses:
GEO. S. MONTGOMERY,
HOMER T. BARRY.